United States Patent
Wilborn et al.

(10) Patent No.: US 7,499,428 B2
(45) Date of Patent: Mar. 3, 2009

(54) METHOD, APPARATUS, AND SYSTEM FOR RECEIVING DATA ON A FIRST FREQUENCY BAND AND OBSERVING A SECOND FREQUENCY BAND

(75) Inventors: Thomas B. Wilborn, San Diego, CA (US); Johnny K. John, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 806 days.

(21) Appl. No.: 10/388,668

(22) Filed: Mar. 14, 2003

(65) Prior Publication Data

US 2004/0090947 A1 May 13, 2004

Related U.S. Application Data

(60) Provisional application No. 60/424,753, filed on Nov. 7, 2002.

(51) Int. Cl.
*H04J 3/00* (2006.01)
(52) U.S. Cl. .................. 370/330; 370/458; 370/468; 370/478; 455/458; 455/343.2
(58) Field of Classification Search .................. 370/330, 370/345, 337, 332, 436, 458, 468, 478; 455/458, 455/437, 440, 459, 433.2
See application file for complete search history.

(56) References Cited

U.S. PATENT DOCUMENTS

| | | | |
|---|---|---|---|
| 6,044,270 A | 3/2000 | Raith | .......................... 455/434 |
| 6,049,532 A | 4/2000 | Steele et al. | |
| 6,246,867 B1 | 6/2001 | Jakobsson | .................... 455/324 |
| 6,408,168 B1 * | 6/2002 | Sessink | .................... 455/250.1 |
| 6,408,169 B1 * | 6/2002 | Pallonen | .................... 455/277.2 |
| 6,490,261 B1 * | 12/2002 | Dent et al. | .................... 370/337 |
| 6,532,224 B1 * | 3/2003 | Dailey | ........................ 370/337 |

(Continued)

FOREIGN PATENT DOCUMENTS

EP 0889600 1/1999

(Continued)

OTHER PUBLICATIONS

International Search Report PCT/US2003/036084, International Search Authority European Patent Office Apr. 27. 2004.

(Continued)

*Primary Examiner*—George Eng
*Assistant Examiner*—Brandon J Miller
(74) *Attorney, Agent, or Firm*—Darren M. Simon; Kam T Tam; Thomas R Rouse

(57) ABSTRACT

A method of signal reception according to one embodiment of the invention includes receiving a set of data values over a first frequency band during a first time slot, and receiving another set of data values over the first frequency band during a second time slot which is after the first time slot. Between the first and second time slots, the method includes sampling a signal received over a second frequency band and storing the samples. Based on the samples, a received signal quality value is calculated.

9 Claims, 14 Drawing Sheets

U.S. PATENT DOCUMENTS

| | | | |
|---|---|---|---|
| 6,611,509 B1* | 8/2003 | Hayashi et al. | 370/335 |
| 6,735,243 B1* | 5/2004 | Akopian | 375/150 |
| 6,744,747 B2 | 6/2004 | Shiu et al. | |
| 6,882,833 B2* | 4/2005 | Nguyen | 455/137 |
| 6,950,624 B2* | 9/2005 | Kim et al. | 455/3.01 |
| 7,020,109 B2* | 3/2006 | Grilli et al. | 370/331 |
| 2003/0032389 A1* | 2/2003 | Kim et al. | 455/3.01 |
| 2003/0223355 A1* | 12/2003 | Pan et al. | 370/210 |
| 2004/0121780 A1* | 6/2004 | Nasshan | 455/455 |

FOREIGN PATENT DOCUMENTS

WO      9949685      9/1999

OTHER PUBLICATIONS

International Preliminary Examination Report PCT/US2003/036084, IPEA/US Apr. 29, 2005.

* cited by examiner

F = Frequency Correction Channel (FCH)
S = Synchronization Channel (SCH)
BCCH = Broadcast Control Channel (BCCH)
CCCH = Common Control Channel (CCCH)
I = (idle frame)

METHOD, APPARATUS, AND SYSTEM FOR RECEIVING DATA ON A FIRST FREQUENCY BAND AND OBSERVING A SECOND FREQUENCY BAND

RELATED APPLICATIONS

This application claims priority to U.S. Provisional Application No. 60/424,753 filed Nov. 7, 2002.

BACKGROUND

1. Field of the Invention

This invention relates to wireless communications.

2. Background Information

A network for wireless cellular telephony typically includes a set of fixed base stations that communicate wirelessly with mobile units. In some cases, the individual base stations may be geographically separated from one another. In other cases, more than one base station may be present at a single location. For example, a single site may have three different transmitters, each covering a different 120-degree-wide sector of a horizontal plane. In another example, a single site has six different transmitters, each covering a different 60-degree-wide sector of a horizontal plane. Collocated base stations may also differ in terms of characteristics other than directional orientation (e.g., transmission frequency).

While a mobile unit is typically embodied in a cellular telephone, other devices may also be equipped with mobile units that support voice and/or non-voice data transfer with the network. Such devices include personal digital assistants (PDAs), laptop or notebook computers having integrated or accessory wireless modems (e.g. embodied in PCMCIA cards), and other consumer electronics devices. Mobile units may also be embodied in devices that are intended to operate in generally fixed locations, such as wireless local loop (WLL) units, point-of-sale (POS) units, or other home or business appliances.

During operation, a mobile unit is typically in one of two modes. The mobile unit operates in idle mode when it is not engaged in a communications session (e.g. before a call is initiated or received, or after a call is completed). While in idle mode, the mobile unit listens to a selected channel (e.g. a particular frequency band, code channel, and/or time slot) for a paging message that indicates an incoming call. During idle mode, the mobile unit may also receive control information from (or transmit such information to) the network. After a paging message directed to the mobile unit is received, or when the user initiates a telephone call or other communications session (e.g. a request for data transfer access to support an activity such as e-mail and/or Internet access), the mobile unit enters a dedicated mode.

For portable electronic devices (such as mobile units), it is generally desirable to increase the period of time over which the device may be used before replacement or charging of the power source is needed. Among the subsystems of a mobile unit, the radio-frequency (RF) subsystem is typically one of the greatest power consumers. Therefore, it is generally desirable to limit the amount of time during which the RF subsystem is powered.

One technique currently used to reduce RF subsystem on-time during idle mode is discontinuous reception. For example, a system using this technique may be configured such that a paging message directed to a particular mobile unit will be transmitted by the network only within certain predetermined time intervals. Therefore, the RF subsystem of a mobile unit in idle mode only needs to be powered up and ready to receive during those predetermined time intervals and can be powered down the rest of the time.

From time to time, it may be desirable for the mobile unit to listen for paging messages on a different channel. For example, the propagation path of the channel being monitored by the mobile unit may be subject to change (e.g. as the mobile unit moves from one location to another relative to the base station transmitting on the channel), such that reception of the selected channel could become unreliable. In order for the mobile unit and/or the network to determine whether a different base station—and which other base station—should transmit paging messages that are directed to the mobile unit, a mobile unit typically monitors the quality of channels associated with other base stations. Such monitoring is typically performed during both idle mode (e.g. to support a continued ability to receive paging messages and other broadcast information) and dedicated mode (e.g. to support the ability to continue the communications session between the mobile unit and the network).

The task of monitoring the quality of other channels may give rise to problems. In idle mode, for example, this task may increase the proportion of time during which the RF subsystem remains powered, thus reducing the operating time between battery charges. In dedicated mode, time spent monitoring the quality of other channels may conflict with time needed to perform other on-line tasks such as communication of voice and/or non-voice data.

SUMMARY

A method of signal reception according to one embodiment of the invention includes receiving a first set of data values over a first frequency band during a first time slot, and receiving a second set of data values over the first frequency band during a second time slot which is after the first time slot. Between the first and second time slots, the method includes sampling a signal received over a second frequency band and storing the samples. Based on the samples, a received signal quality value is calculated. In some implementations of such a method, calculation of the received signal quality value based on the stored samples allows a reduction in RF subsystem on-time (and a corresponding reduction in power consumption). In other implementations, calculation of the received signal quality value based on the stored samples leaves the RF subsystem available for other uses.

DETAILED DESCRIPTION

In a multiple-access network such as a network for cellular telephony, the frequency spectrum allocated to the network may be divided into separate channels in several different ways. In a TDMA (time-division multiple-access) network, time is divided into interleaved sets of nonoverlapping time slots, with different channels being active over different sets of time slots. In a FDMA (frequency-division multiple-access) network, the network's frequency allocation is divided into bands, with different channels being active over different bands. In a CDMA (code-division multiple-access) network, communications over each channel are distinguished from communications over other channels (which may be active at the same time and over the same frequency band) through coding with one or more orthogonal or nearly orthogonal codes.

Figure 1:
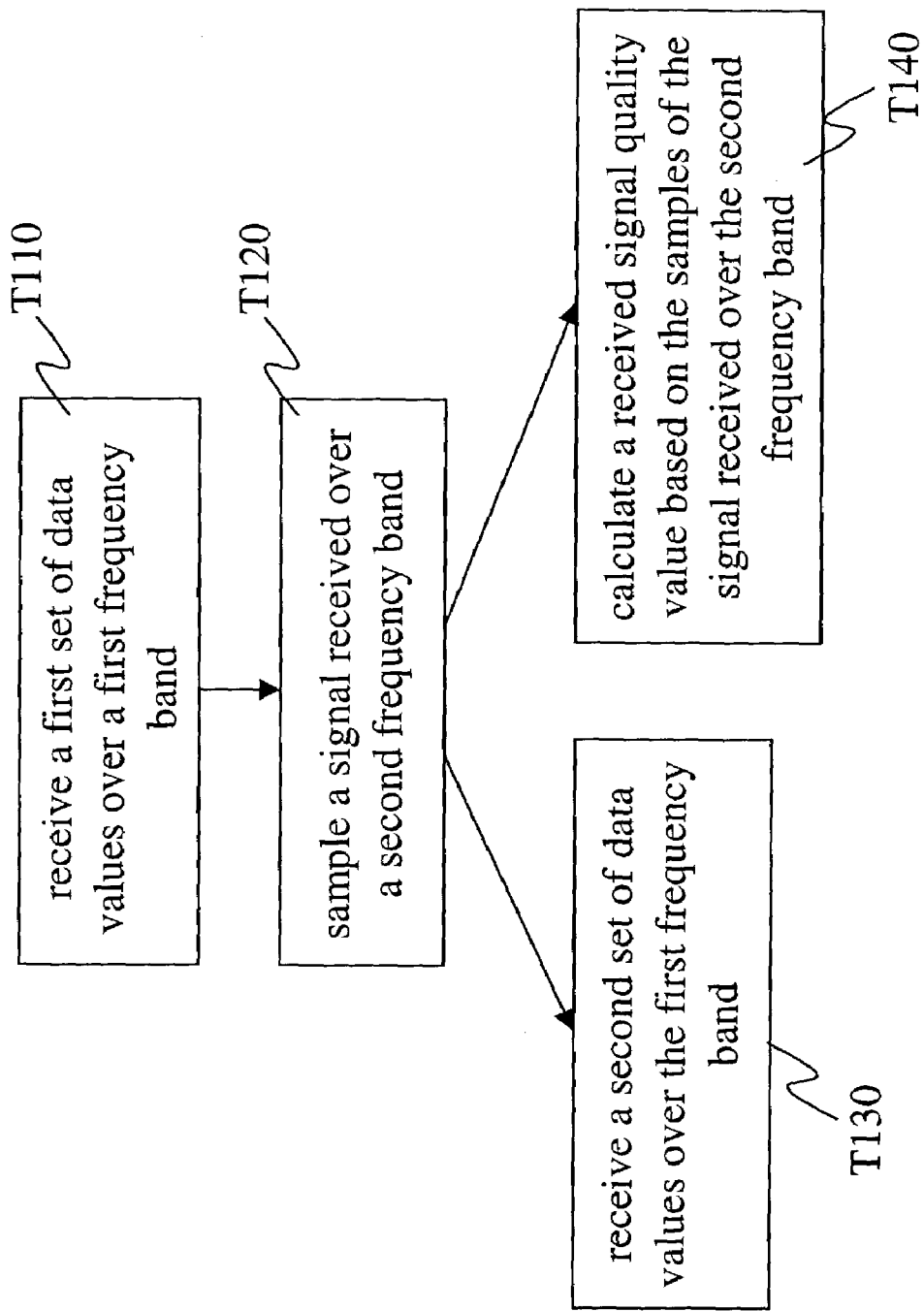
FIG. 1 shows a flowchart for a method according to an embodiment of the invention.

FIG. 1 shows a flowchart of a method according to an embodiment of the invention. Task T110 receives a set of data values (e.g. a data burst) over a first frequency band. Task T120, which executes after task T110, samples a signal received over a second frequency band. Task T130, which executes after task T120, receives another set of data values over the first frequency band. Task T140, which also executes after task T120, calculates a received signal quality value based on the samples of the signal received over the second frequency band. The received signal quality value may then be applied locally and/or transmitted to another entity (e.g. to a network) for evaluation Implementations of a method as shown in FIG. 1 may be applied to support access to more than one wireless network, to support monitoring of more than one wireless network, and/or to support handover between different networks.

Figure 2:
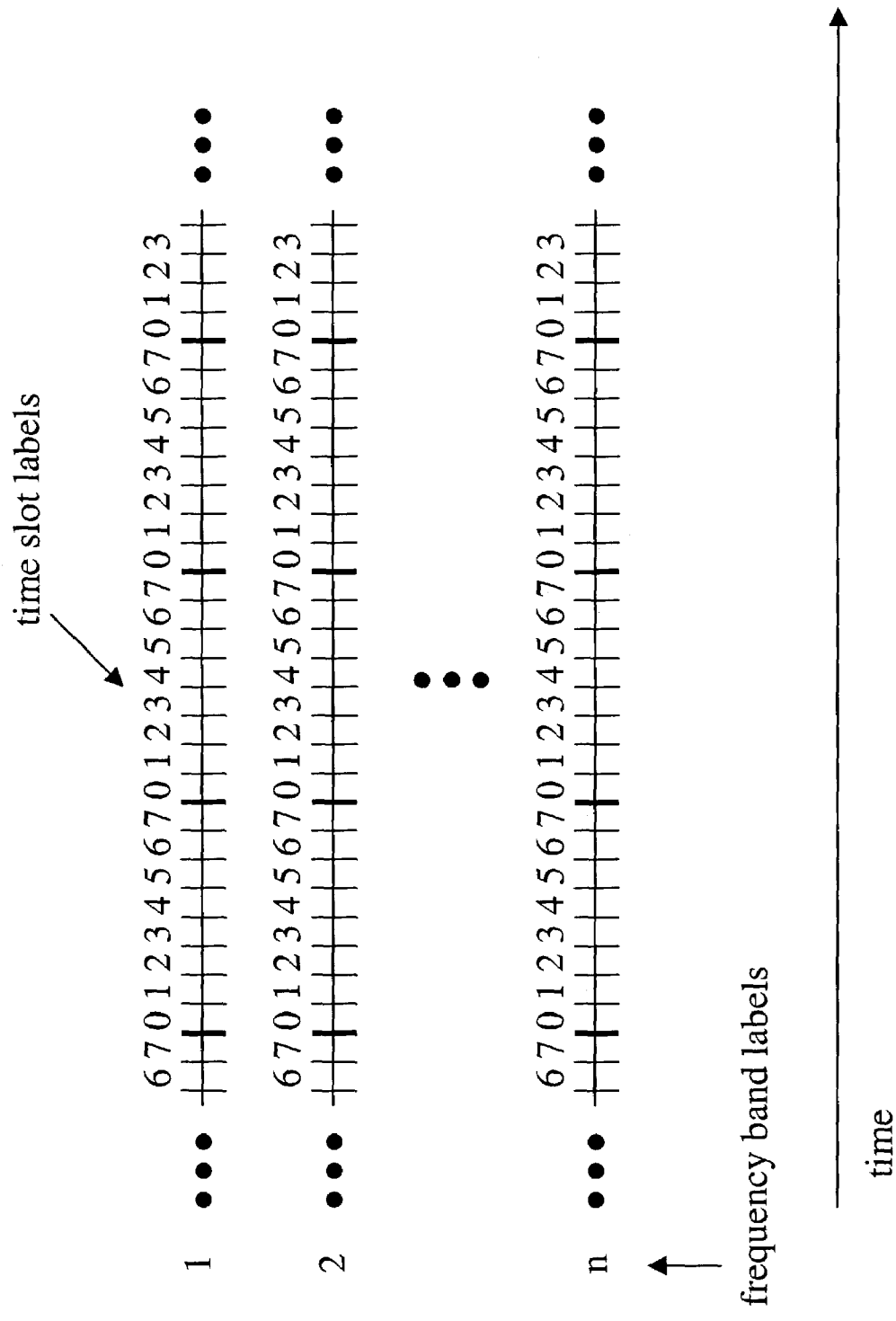
FIG. 2 is a diagram showing a TDMA/FDMA system having n frequency bands and frames divided into 8 time slots.

A GSM-compatible network operates in accordance with Global System for Telecommunications (GSM) standards published by the European Telecommunications Standards Institute (ETSI, Sophia Antipolis, France). Such a network is both a TDMA network and an FDMA network. In a GSM-compatible network, each time slot has length 15/26 ms (approximately 0.577 ms) and is labeled with a number from 0 to 7. A group of eight time slots from number 0 to number 7 is called a frame and has length 120/26 ms (approximately 4.615 ms), and each traffic channel is assigned to a particular time slot number. In the frequency domain, the spectrum allocated to the network is divided into bands centered at carrier frequencies spaced 200 kHz apart, each channel being assigned to a particular frequency band, with corresponding uplink and downlink bands being located 45 MHz apart. For example, an allocation of 2×25 MHz may be divided into 125 duplex frequency bands (each carrying up to eight duplex physical channels). FIG. 2 shows an example of a TDMA/FDMA scheme having n frequency bands and frames divided into eight time slots.

Figure 3:
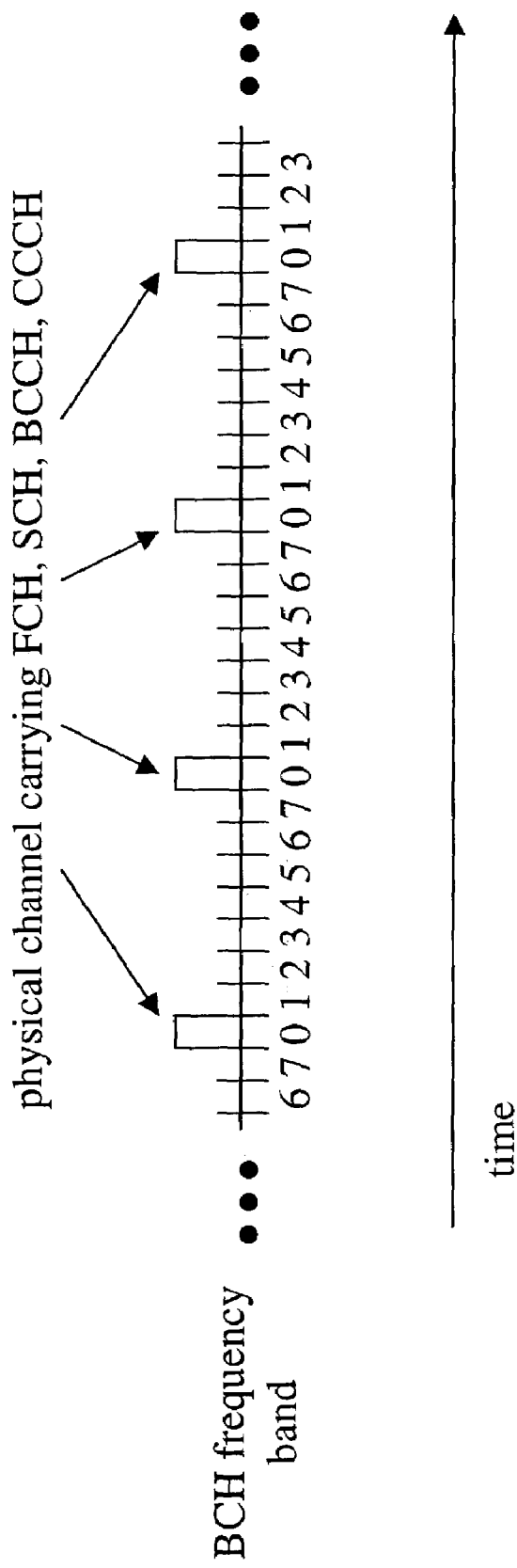
FIG. 3 illustrates the slots occupied by a GSM BCH.
Figure 4:
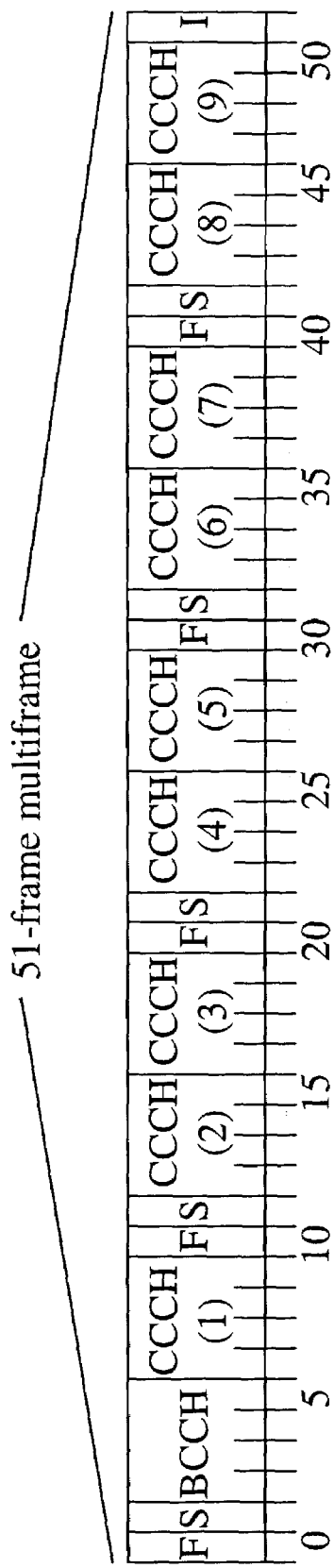
FIG. 4 shows a diagram of a 51-frame multiframe of time slot 0 of a GSM BCH.

When a GSM-compatible mobile unit is turned on, it selects and camps on (i.e. listens for paging messages on) a downlink frequency band that is configured as a Broadcast Channel (BCH). As shown in FIG. 3, the BCH frequency band carries several different logical control channels on its first time slot (time slot 0): the Frequency Correction Channel (FCH), the Synchronization Channel (SCH), the Broadcast Control Channel (BCCH), and the Common Control Channel (CCCH). These logical control channels are transmitted according to a multiframe schedule (including one idle frame) which repeats every 51 frames. FIG. 4 shows an example of one such schedule. To avoid interfering with one another, adjacent base stations (or sectors) typically carry their BCHs on different frequency bands.

Paging messages are transmitted as blocks on the Paging Channel (PCH), a logical channel that is part of the CCCH. Each paging block occupies time slot 0 of four consecutive frames, and the mobile unit must receive the entire block to receive a complete paging message. Each paging block has a paging group number, and each mobile unit is also assigned a paging group number. Paging messages directed to the mobile unit are transmitted in paging blocks belonging to its paging group, and it is not necessary for the mobile unit to receive paging blocks that do not belong to its paging group.

Figure 5:
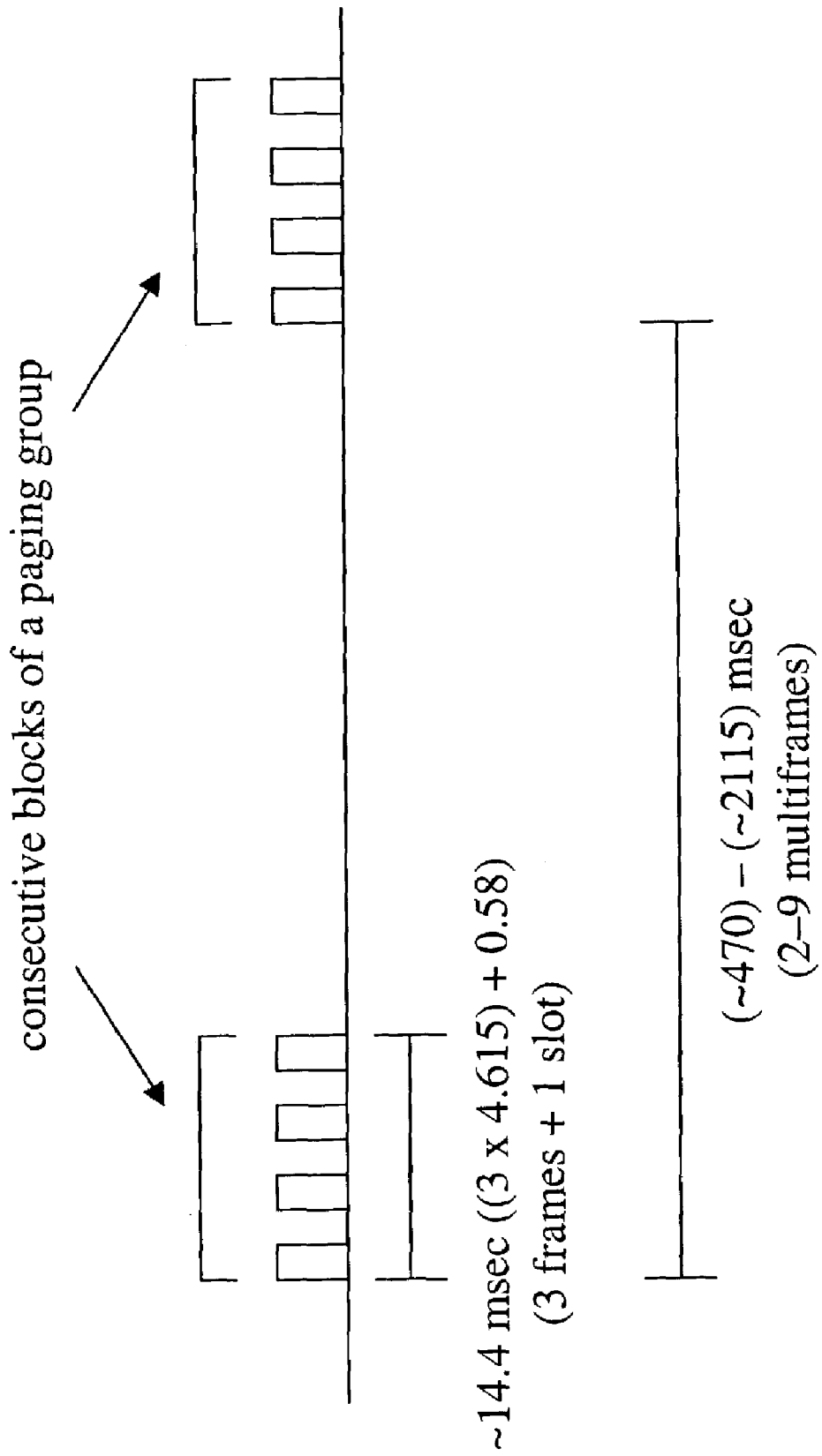
FIG. 5 shows a timing diagram for two consecutive paging blocks of a GSM paging group.

The next paging block for a particular paging group may appear after an interval of 2 to 9 multiframes, as indicated by the value of system parameter BS_PA_MFRMS which is broadcast on the BCCH. Therefore, the RF receiving circuit of a mobile unit in idle mode should be powered up and ready to receive a paging block approximately every 470 ms to 2.1 sec (FIG. 5). In between these intervals, the RF receiving circuit may be powered down to reduce power consumption.

As mentioned above, it is desirable for a mobile unit to monitor the quality of channels associated with other nearby base stations. Such monitoring may include measuring the power levels of signals received over these channels. The BCH is designed to provide a basis for these measurements. Every time slot of the BCH includes a data burst or a dummy burst, such that every time slot is active and no time slots are idle. Therefore, a mobile unit may measure the received signal quality of a BCH asynchronously (i.e. without acquiring the timing of the transmitting base station).

In addition to the value of the parameter BS_PA_MFRMS, the BCCH carries information identifying the frequencies over which neighboring base stations carry their BCHs. If it is determined (e.g. by the mobile unit and/or by the network) that a channel associated with another base station is more suitable than the channel on which the mobile unit is currently camped, then the mobile unit will camp on that channel instead.

Monitoring of the quality of other channels also continues during dedicated mode. If it is determined (by the mobile unit and/or by the network) that a channel associated with another base station is more suitable than the channel currently carrying the communications session, a handover operation will be performed in which the communications session with the mobile unit will be handed over to the new base station. Therefore, future data bursts in the same communications session may be received over a different channel or even a different frequency.

Recently, 3GPP standards that define UTMS (Universal Mobile Telecommunications System) operations have been promulgated (the UTMS standards are also published by ETSI). A UMTS network is a CDMA network that may also have a TDMA and/or FDMA structure. A mobile unit that may communicate with either GSM or UMTS networks is called a multi-RAT (Radio Access Technology) mobile unit.

In at least some implementations, a UTMS network may coexist geographically (e.g. have nearby or even overlapping coverage) with a GSM network.

Recent changes to the GSM standards (e.g. Technical Specification 05.08, renumbered as 45.008) allow handover from a GSM network to a UTMS network. These standards require multi-RAT units connected to GSM networks to carry out an indication from the network to evaluate surrounding UMTS cells, in addition to surrounding GSM cells, for possible reselection or handover.

As noted above, monitoring the quality of channels associated with nearby base stations within a GSM network may be performed with asynchronous power measurements. For a channel associated with a base station within a UMTS network, the quality of the channel is evaluated according to a comparison between the value of a quality parameter denoted as RSCP (received signal code power) and a threshold value received over the BCCH. The parameter RSCP is itself a function of two other parameters:

$$RSCP = RSSI \times CPICH\ Ec/Io.$$

The parameter RSSI (received signal strength indicator) is based on an asynchronous measurement and may be evaluated without timing information. Unfortunately, the parameter CPICH Ec/Io, which is the ratio of pilot energy to total energy (Ec/Io) of the CPICH (common pilot channel), is a synchronous measurement. In order to evaluate CPICH Ec/Io, the code timing must be identified for each pilot signal that is to be evaluated.

The 3GPP standards provide that a CPICH may be encoded with one of 512 different primary scrambling codes. The characteristic sequence of each code has a length of 38,400 chips and a period of 10 ms. These standards also provide that a multi-RAT mobile unit communicating with a GSM network (in idle or dedicated mode) may be provided with a list of three different frequencies to monitor, with up to 32 unique scrambling codes to locate for each frequency, up to a maximum of 64 UMTS base stations total. Within a short time period (e.g. within 30 seconds of power-up), therefore, a multi-RAT mobile unit may be required to determine the timing of up to 64 different scrambling codes to descramble.

In order to locate each scrambling code, many different timing hypotheses must be evaluated. However, it is desirable to reduce the active time of the RF subsystem to conserve power, and it is also desirable to avoid disrupting the other operations of the mobile unit.

In a method according to an embodiment of the invention as shown in FIG. 1, two sets of data values are received over a first frequency band. At a time between the reception of these two data sets, a signal received over a second frequency band is sampled. A received signal quality value is then calculated based on the samples of the signal received over the second frequency band. In an exemplary implementation of such a method to a mobile unit, processing of the sampled signal (including calculation of the received signal quality value) is performed while the RF receiving circuit is powered down, which may conserve power and/or reduce on-air time usage.

Figure 6:
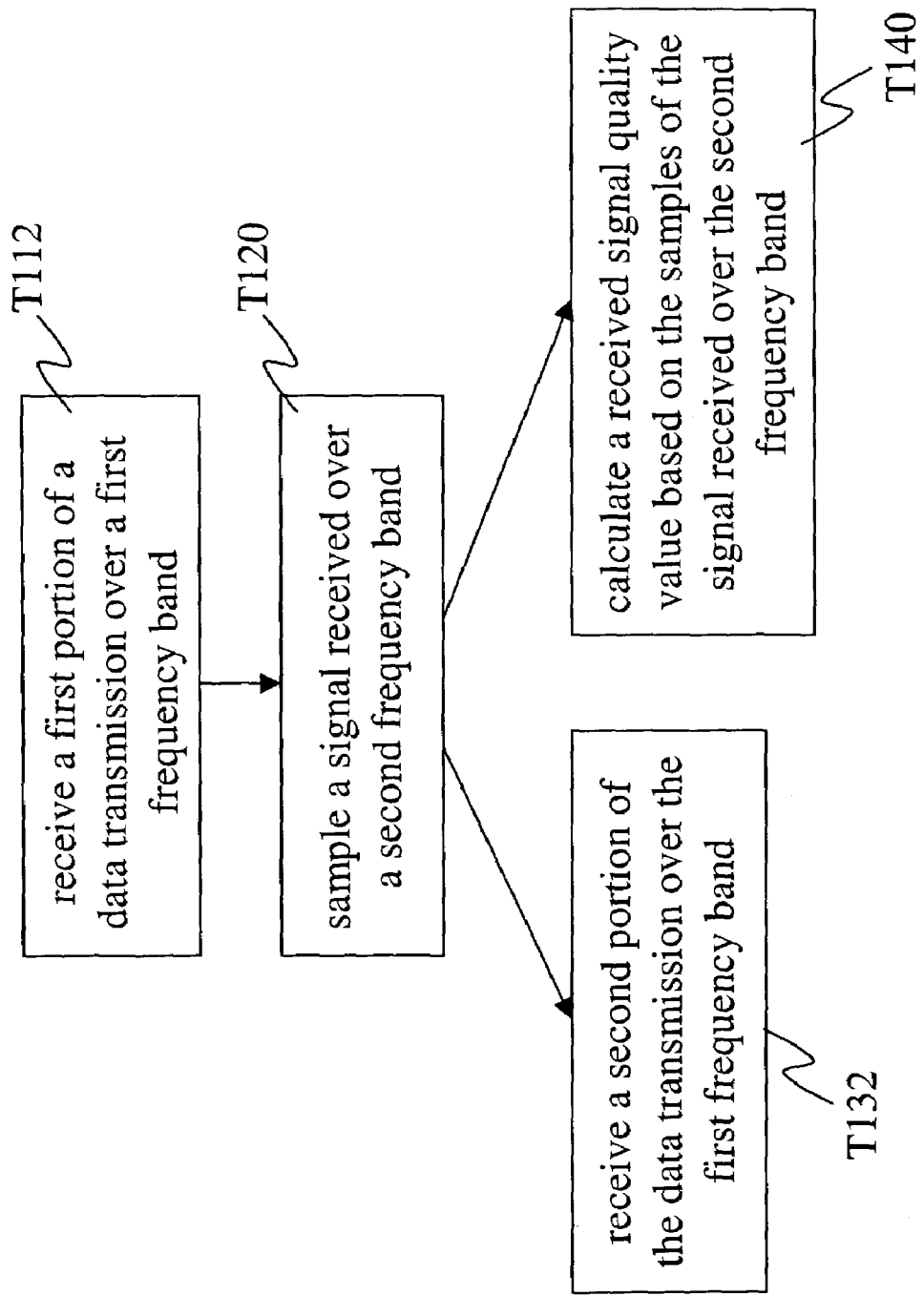
FIG. 6 shows a flowchart for an implementation of a method according to FIG. 1.

FIG. 6 shows a flowchart of a method as shown in FIG. 1 that includes specific implementations T112 and T132 of tasks T110 and T130, respectively. Task T112 receives a portion of a data transmission over the first frequency band. Task T120, which executes after task T110, samples a signal received over a second frequency band. Task T132, which executes after task T120, receives another portion (e.g. the next portion) of the data transmission over the first frequency band. Task T140, which also executes after task T120, calculates a received signal quality value based on the samples. This value may be expressed in absolute terms (e.g. the value of a predetermined characteristic of the received signal, such as power) or in relative terms (e.g. a value indicating a relation between the value of a predetermined signal characteristic and one or more predetermined thresholds). For a measurement relating to a UMTS channel, for example, this value may be the RSCP, a binary indication of whether the RSCP exceeds a threshold value, an indication of the extent to which the RSCP exceeds or falls below a threshold value, or an indication of a relation between the RSCP and several predetermined thresholds (e.g. exceeds threshold 2 but falls below threshold 1). The received signal quality value may be transmitted to another entity such as a network (whether periodically or upon a specified condition or event) and/or applied locally in channel selection control decisions.

In one example, tasks T112 and T132 receive consecutive bursts of a paging block. In another example, tasks T112 and T132 receive consecutive bursts of a telephone call or other communications session. In another example, tasks T112 and T132 receive bursts of the BCCH and PCH (or vice versa), respectively.

Figure 7:
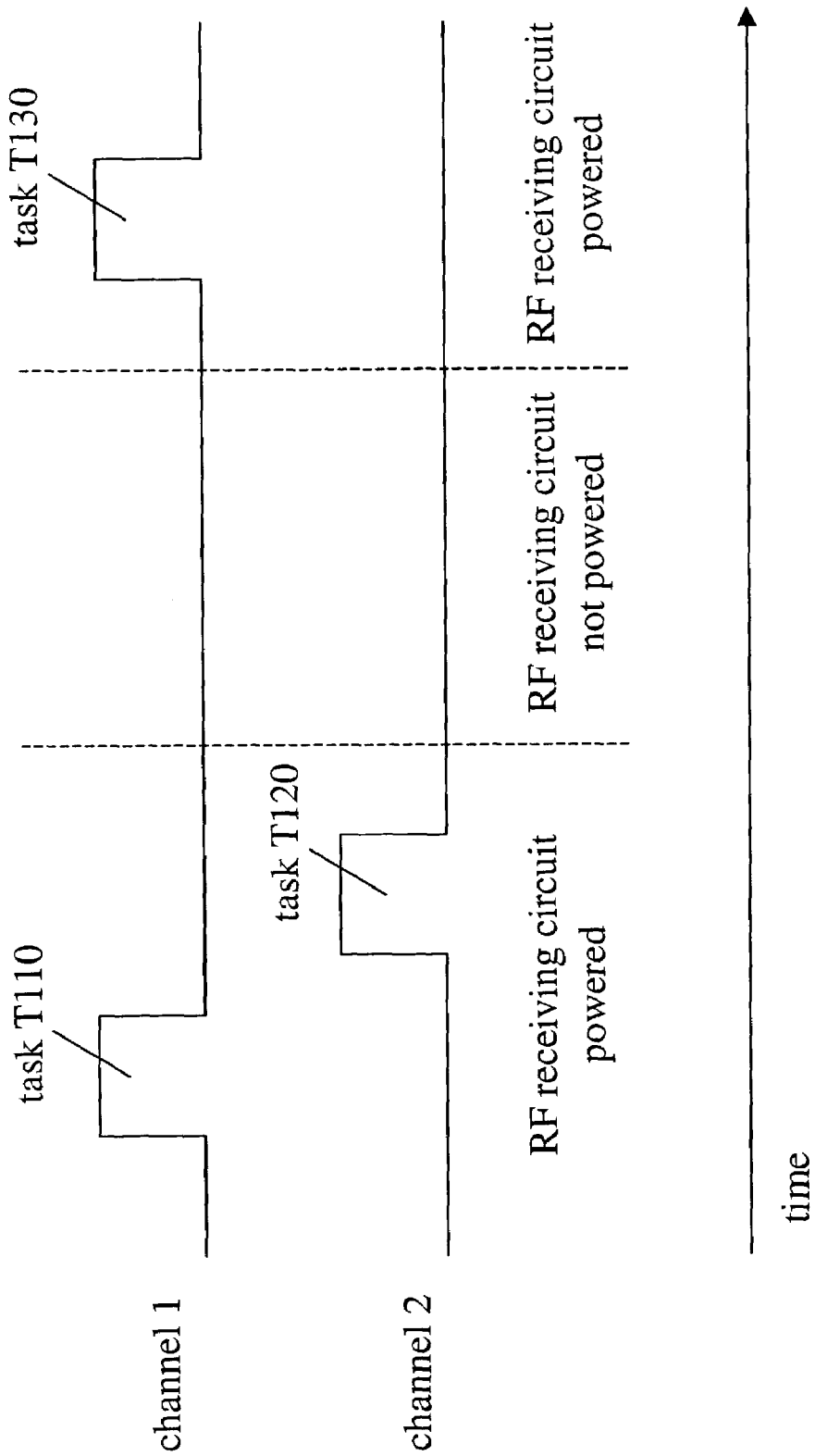
FIG. 7 shows a timing diagram of an application of a method according to an embodiment of the invention.
Figure 8:
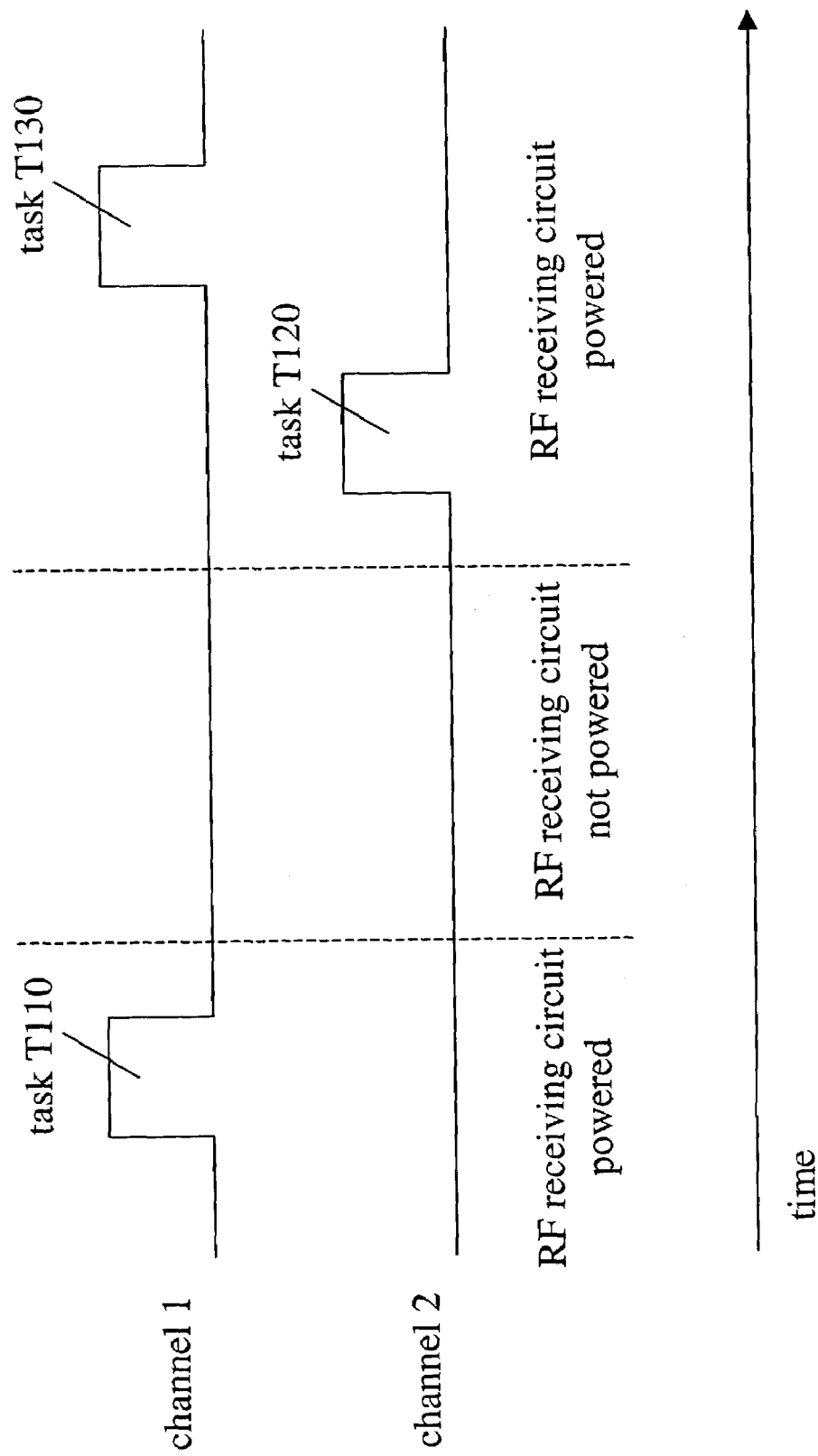
FIG. 8 shows a timing diagram of an application of a method according to an embodiment of the invention.

In some applications, it may be desirable for the RF receiving circuit of the mobile unit to remain continuously powered from the start of task T110 to the completion of task T130. For example, the interval between the two tasks may be so short that cycling of power to the RF receiving circuit is not feasible. Such a situation may arise in some systems when the mobile unit is engaged in an active communications session. Alternatively, the mobile unit may perform additional tasks in that interval that require the RF receiving circuit to be powered (e.g. reception of message and/or signal quality information on other channels). In other applications, the RF receiving circuit may be powered down for at least a portion of the interval between the completion of task T110 and the start of task T130. FIG. 7 shows a timing diagram for an implementation in which task T120 occurs after task T110 has been performed and while the RF receiving circuit is still powered. FIG. 8 shows a timing diagram for an implementation in which task T120 occurs after the RF receiving circuit has been powered up and before task T130 is performed.

Figure 8A:
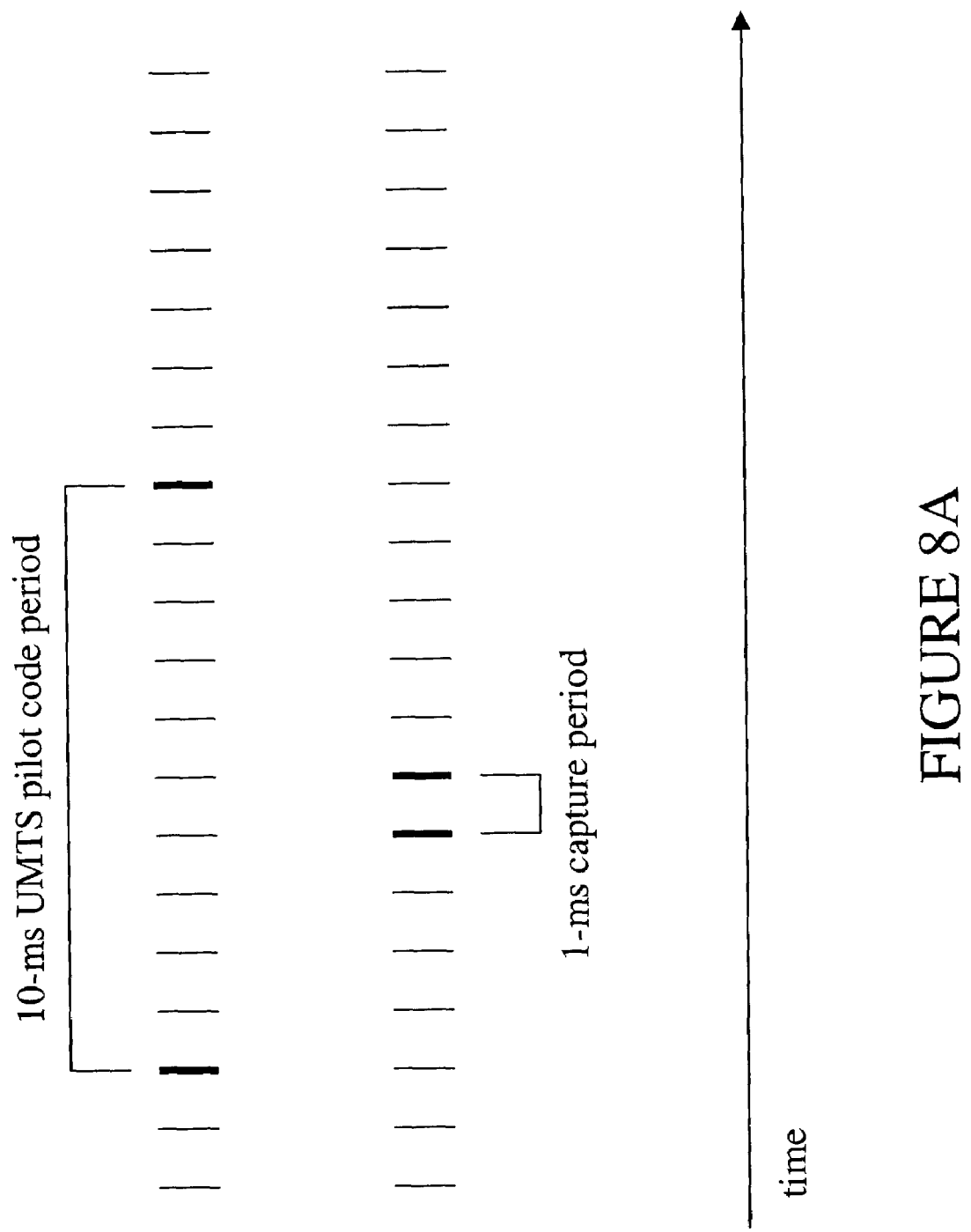
FIG. 8A shows an example of a 1-ms capture period as applied to a UMTS pilot signal having a 10-ms code period.

In a pilot signal broadcast by a UMTS base station, the 10-ms primary scrambling code is always on, and the choice of capture period is completely arbitrary. In an application in which task T120 samples a signal that is covered, spread, or scrambled using a periodic code (e.g. a CDMA signal), it may be desirable for task T120 to capture samples over a period that is less than an entire code period (i.e. an observation that corresponds to only a portion of the code sequence). For example, such a feature may be applied in a situation in which the cross-correlation between different scrambling codes is very low (as among the pilot signals of a UMTS network). Possible advantages of such an implementation may include reduced storage requirements and reduced power consumption. In one example, a capture period of 1 ms per frequency is used. FIG. 8A shows an application of this example to the capture of a portion of a UMTS pilot signal. In another application, a longer capture period may be desired.

Figure 9:
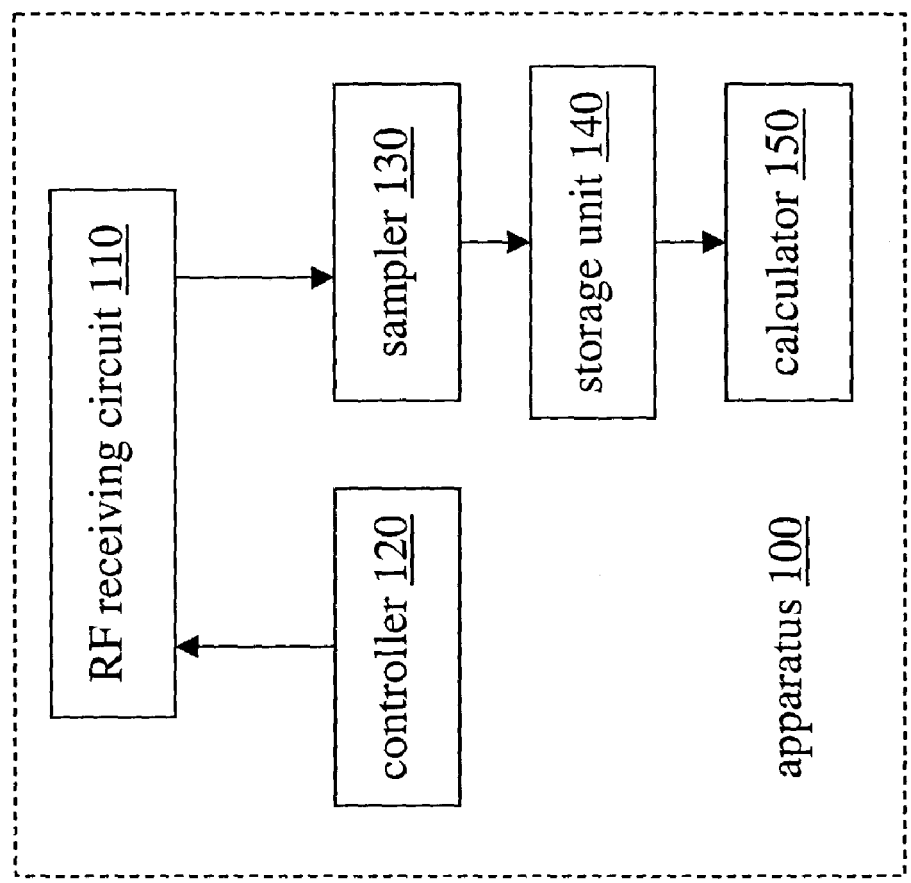
FIG. 9 shows a block diagram of an apparatus according to an embodiment of the invention.

FIG. 9 shows a block diagram of an apparatus 100 according to an embodiment of the invention. Radio-frequency receiving circuit 110 receives an RF signal (e.g. from an antenna) and performs signal processing operations such as filtering and amplification to output a received signal. The received signal may be at radio-frequency or may be down-converted to an intermediate frequency or to baseband. Circuit 110 may include one or more integrated circuits fabricated using a technology such as CMOS, GaAs, SiGe, or strained silicon. Circuit 110 may also include discrete components such as filters and/or inductors.

Sampler 130 samples the received signal to produce a sampled signal. It may be desirable for sampler 130 to sample the received signal at no less than twice the frequency of the highest frequency component of the received signal to be resolved (e.g. in accordance with the Nyquist sampling theorem). For a received signal at baseband, for example, it may be desirable for sampler 130 to sample the received signal at a rate that is twice the data rate or higher. For a received CDMA signal at baseband, it may be desirable for sampler 130 to sample the received signal at a rate that is twice the code rate ('chip×2') or higher.

Sampler 130 may be fabricated using a technology such as CMOS, GaAs, SiGe, or strained silicon. In some cases, sampler 130 may be included within an integrated circuit that also includes at least a portion of RF receiving circuit 110. The sampling rate (which may be variable) may be selected or designed according to considerations such as storage capacity (a higher sampling rate may lead to increased storage requirements for the same sampled signal length) and limits of the technology used to fabricate sampler 130.

Storage unit 140 receives and stores the sampled signal. Storage unit 140 may include a RAM (random-access memory) element such as DRAM (dynamic RAM), SRAM (static RAM), flash RAM, or ferroelectric or other magnetic RAM. Storage unit 140 may be fabricated as a separately packaged component or may be included within or packaged together with an integrated circuit that includes another component of apparatus 100.

Calculator 150 retrieves at least a portion of the sampled signal and calculates a received signal quality value based on the samples. For an application in which the sampled signal is a CDMA signal, calculator 150 may perform correlation operations on the samples to determine the presence and location of a particular spreading or scrambling code. Controller 120 controls a receiving frequency of RF receiving circuit 110.

Calculator 150 and controller 120 may each be implemented as one or more arrays of logic elements (e.g. included within an application-specific integrated circuit (ASIC) or a field-programmable gate array (FPGA)). Alternatively, calculator 150 and controller 120 may be implemented as sequences of instructions executing on one or more arrays of logic elements such as a microprocessor, a microcontroller, or a processing core embedded in an ASIC or programmed into a FPGA. An array of logic elements (e.g. a microprocessor) typically consumes much less power than an RF receiving circuit.

Figure 10:
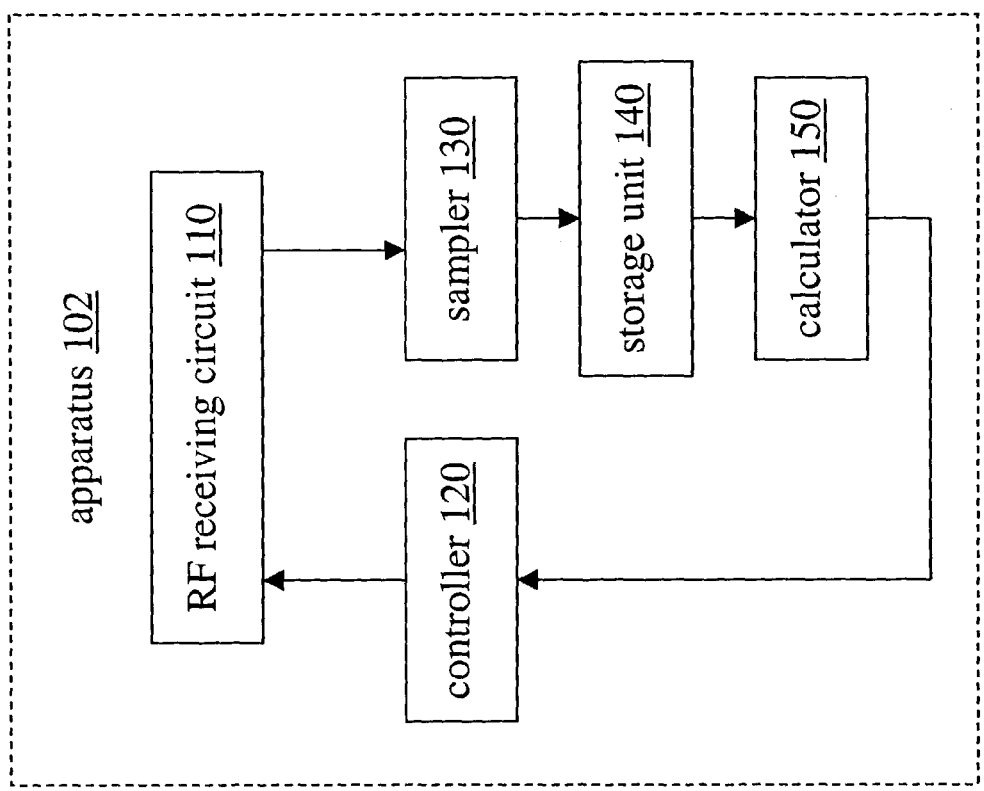
FIG. 10 shows a block diagram of an apparatus according to an embodiment of the invention.

FIG. 10 shows a block diagram of an implementation 102 of apparatus 100 in which calculator 150 outputs a signal to controller 120. In one version of apparatus 102, calculator 150 outputs a signal quality estimate (e.g. a signal power level measurement result) to controller 120, which determines whether to change the receiving frequency of RF receiving circuit 110. In another version of apparatus 102, calculator 150 instructs controller 120 to change the receiving frequency of RF receiving circuit 110 on the basis of a signal quality estimate.

In an exemplary application, an implementation of apparatus 100 is used to capture samples for off-line processing. For example, such capture may be performed between time slots of a paging group and/or between paging groups.

For processing of CDMA signals, calculator 150 may include a searcher (e.g. in hardware and/or in software) as is known in the art. One searcher implementation, which can test up to 64 different timing hypotheses for each of up to four different codes at the same time, is referred to as a 256× searcher because it performs code searching at 256 times the chip rate. Other fast searching strategies that may be applied within calculator 150 are disclosed in pending U.S. Patent applications bearing attorney docket nos. 010334 (METHOD AND APPARATUS FOR W-CDMA HANDOFF SEARCHING) and 010478 (SEGMENTED CDMA SEARCHING).

Traffic transmissions between a mobile unit and a GSM base station (e.g. during dedicated mode) occur within a 26-frame multiframe structure rather than the 51-frame multiframe structure of the control channels. In the 26-frame structure, frames 0 through 24 are active and frame 25 is idle.

As noted above, it may be desirable to monitor the quality of channels during dedicated mode. A multi-RAT mobile unit may also be required to monitor the quality of channels associated with nearby UMTS base stations. Within the 25 active frames of a traffic multiframe, however, no free period exists during which a UNITS channel may be monitored for a full period of the 10-ms code, unless traffic transmission and/or reception is not performed during that period. While the idle frame might be used to reduce the impact of UMTS monitoring on traffic channel performance, the idle frame may not be available for such monitoring, as mobile units are typically implemented to perform other on-line tasks during the idle frame.

Figure 11:
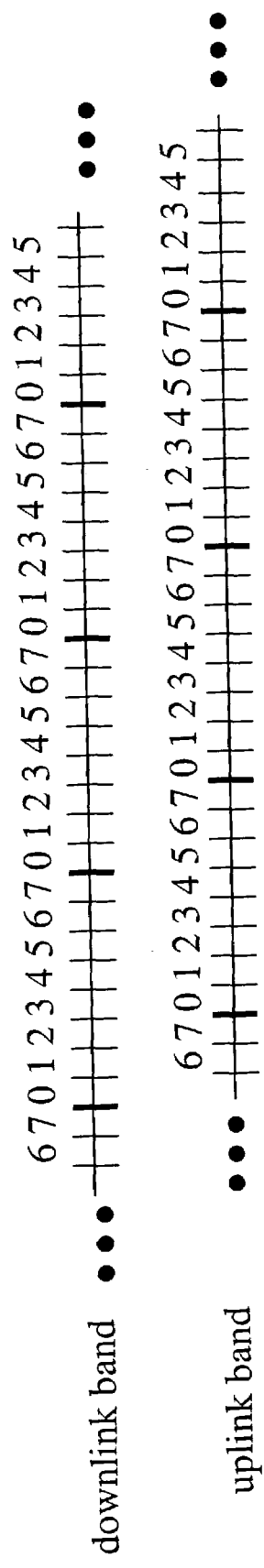
FIG. 11 shows an offset between time slots of an uplink band and a corresponding downlink band of a GSM network.
Figure 12:
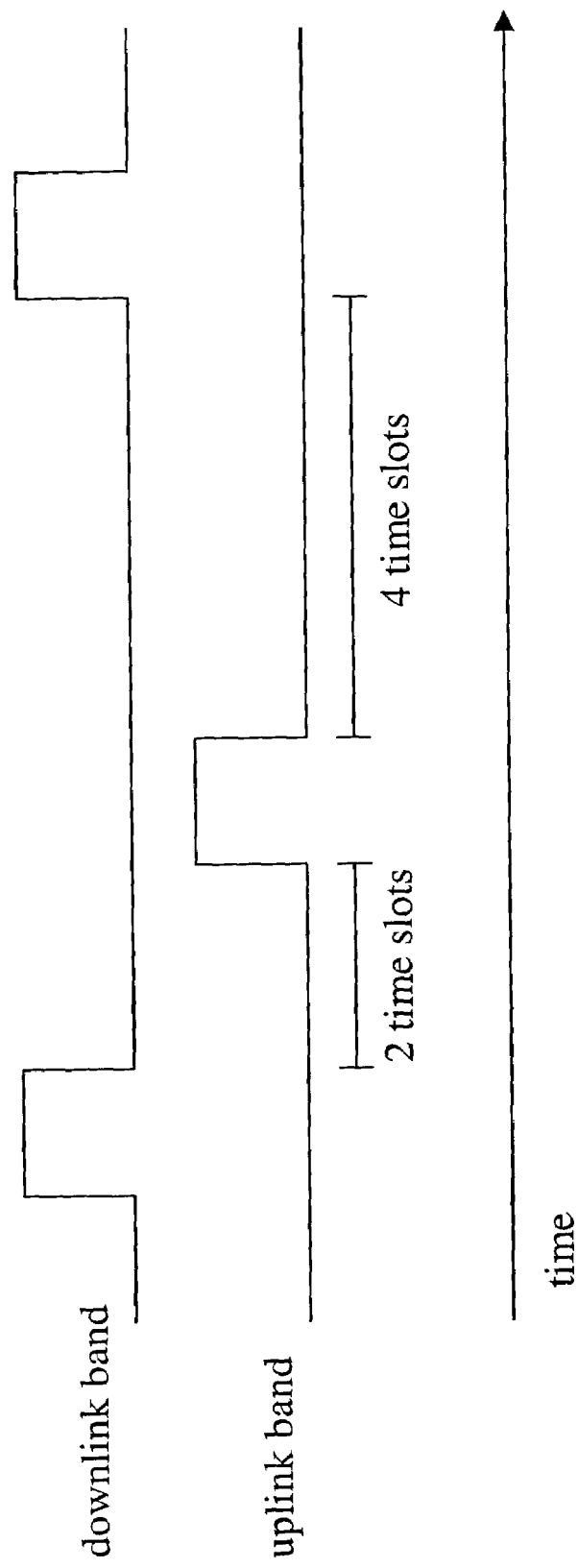
FIG. 12 shows a timing diagram of three bursts of a communications session between a GSM base station and a mobile unit.

As shown in FIG. 11, the time slots of the downlink band in a GSM network are delayed by two time slots with respect to the time slots of the corresponding uplink band. FIG. 12 shows a diagram of the timing of three bursts of a communications session between a GSM base station and a mobile unit. A period of two time slots is available between a traffic burst transmitted by the base station (on the downlink band) and the next traffic burst transmitted by the mobile unit (on the uplink band). This delay allows the mobile unit to change the frequency of its transceiver (which typically includes the RF receiving circuit) from the downlink band to the uplink band. A period of four time slots is available between a traffic burst transmitted by the mobile unit and the next traffic burst transmitted by the base station.

Figure 12A:
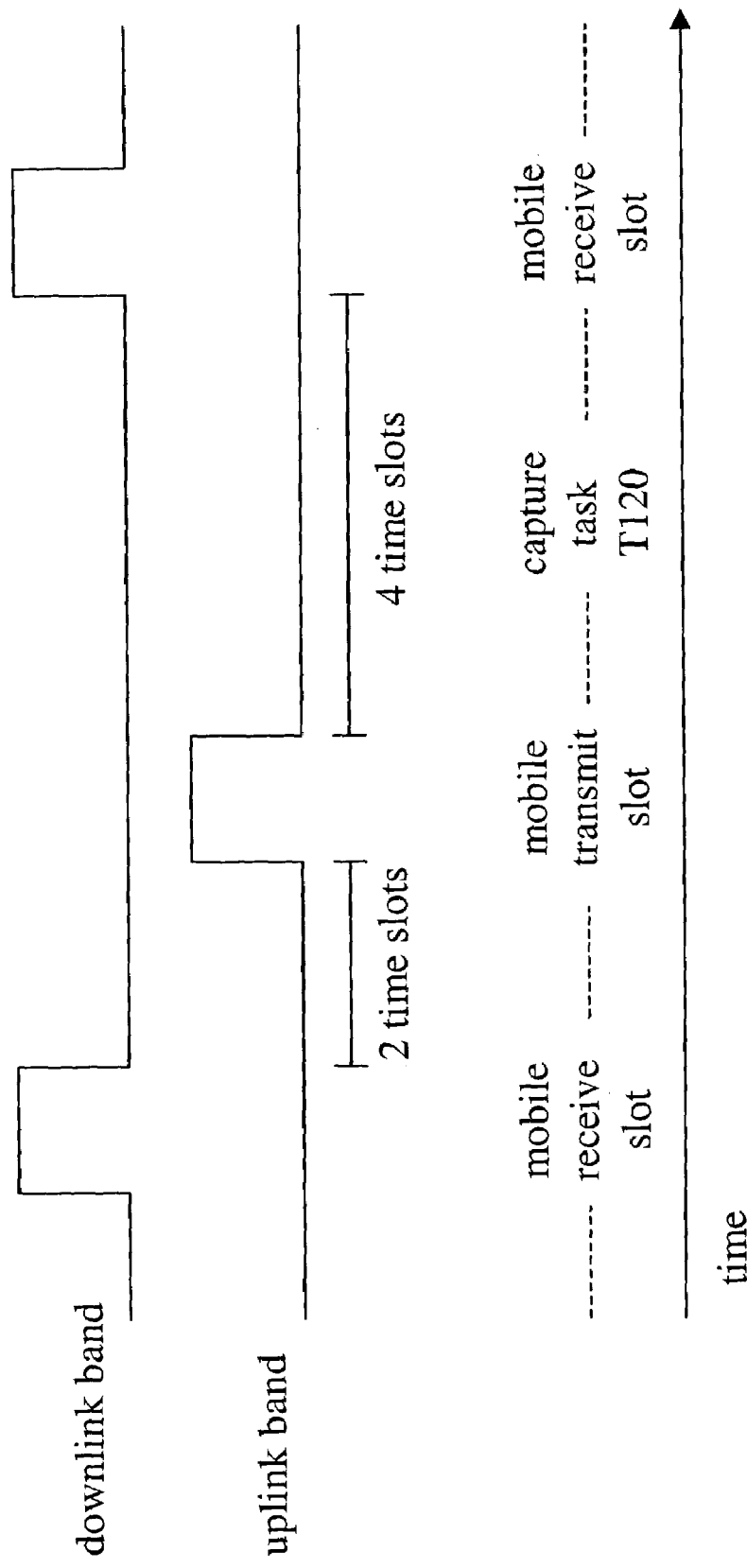
FIG. 12A shows a timing diagram of an application of a method according to an embodiment of the invention to a situation as shown in FIG. 12.

In dedicated mode, therefore, a period of four time slots (or approximately 2.3 milliseconds) is available between the end of a transmit slot and the start of the next receive slot. As noted above, the capture period may be shorter than the code period in certain situations (e.g. monitoring a UMTS pilot channel). FIG. 12A illustrates how a method according to an embodiment of the invention may be applied to a situation as shown in FIG. 12 by performing capture task T120 between the end of a transmit slot and the start of the next receive slot, thus leaving the RF receiving circuit available for other on-line tasks during the idle frame.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit and/or as a circuit configuration fabricated into an application-specific integrated circuit.

The invention may also be implemented as a firmware program loaded into non-volatile storage or a software program loaded from or into a data storage medium (e.g. a semiconductor or ferroelectric memory unit or a magnetic or phase-change medium such as a disk (floppy, hard, CD, DVD, ROM or RAM)) as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

What is claimed is:

1. A method of signal reception, said method comprising:
during a first time slot, receiving a first burst of data over a first frequency band;
during a second time slot after the first time slot, receiving a second burst of data over the first frequency band;
between the first and second time slots, sampling a signal received over a second frequency band and storing the samples;
powering down at least a portion of an Radio Frequency (RF) receiving circuit for at least a portion of an interval between the first and second time slots; and
based on the samples, calculating a received signal quality value during at least the portion of the interval between the first and second time slots during which the RF receiving circuit is powered down by correlating at least a portion of the samples with at least a portion of a scrambling code,
wherein the first burst of data is a burst of a paging block, and wherein the second burst of data is a burst of the paging block that is consecutive to the first burst;
wherein the signal received over the second frequency band has a code period, and wherein a duration of said sampling is not greater than twenty-five percent of the code period.

2. The method of signal reception according to claim 1, said method further comprising transmitting the received signal quality value.

3. The method of signal reception according to claim 1, said method further comprising comparing the received signal quality value to a threshold.

4. A data storage medium having machine-readable code stored thereon, the machine-readable code comprising instructions executable by an array of logic elements, the instructions defining a method of signal reception, said method comprising:
during a first time slot, receiving a first burst of data over a first frequency band;
during a second time slot after the first time slot, receiving a second burst of data over the first frequency band; wherein the first and second bursts of data include consecutive bursts of a paging block;
between the first and second time slots, sampling a signal received over a second frequency band and storing the samples;
powering down at least a portion of an Radio Frequency (RF) receiving circuit for at least a portion of an interval between the first and second time slots; and
based on the samples, calculating a received signal quality value during at least the portion of the interval by correlating at least a portion of the samples with at least a portion of a scrambling code;
wherein the signal received over the second frequency band has a code period, and wherein a duration of said sampling is not greater than twenty-five percent of the code period.

5. The data storage medium according to claim 4, said method further comprising comparing the received signal quality value to a threshold.

6. An apparatus for data reception, said apparatus comprising:
means for receiving, in sequence, (1) a first portion of a data transmission over a first frequency band, (2) a signal over a second frequency band, and (3) a second portion of the data transmission over the first frequency band; wherein the first and second portions of the data transmission include consecutive burst of a paging block;
means for sampling the signal received over the second frequency band;
means for storing the samples;
means for selectively powering down at least a portion of the RF receiving circuit during a portion of an interval between reception of the first portion of the data transmission and reception of the second portion of the data transmission; and
means for calculating a received signal quality value based on the samples during at least the portion of the interval by correlating at least a portion of the samples with at least a portion of a scrambling code;
wherein the signal received over the second frequency band has a code period, and wherein a duration of said sampling is not greater than twenty-five percent of the code period.

7. The apparatus for data reception according to claim 6, said apparatus further comprising means for comparing the received signal quality value to a threshold.

8. An apparatus for data reception, said apparatus comprising:
a radio-frequency (RF) receiving circuit configured and arranged to receive radio-frequency signals;
a controller configured and arranged to control the radio-frequency receiving circuit to receive, in sequence, (1) a first portion of a data transmission over a first frequency band, (2) a signal over a second frequency band, and (3) a second portion of the data transmission over the first frequency band, and further configured to selectively power down at least a portion of the RF receiving circuit during a portion of an interval between reception of the first portion of the data transmission and reception of the second portion of the data transmission; wherein the first and second portions of the data transmission include consecutive bursts of a paging block;
a sampler configured and arranged to sample the signal received over the second frequency band;
a storage unit configured and arranged to store the samples; and
a calculator configured and arranged to calculate a received signal quality value based on the samples during at least the portion of the interval by correlating at least a portion of the samples with at least a portion of a scrambling code;
wherein the signal received over the second frequency band has a code period, and wherein a duration of said sampling is not greater than twenty-five percent of the code period.

9. The apparatus for data reception according to claim 8, said apparatus further comprising a comparator configured to compare the received signal quality value to a threshold.

* * * * *

UNITED STATES PATENT AND TRADEMARK OFFICE
CERTIFICATE OF CORRECTION

| | | |
|---|---|---|
| PATENT NO. | : 7,499,428 B2 | Page 1 of 1 |
| APPLICATION NO. | : 10/388668 | |
| DATED | : March 3, 2009 | |
| INVENTOR(S) | : Wilborn et al. | |

It is certified that error appears in the above-identified patent and that said Letters Patent is hereby corrected as shown below:

Column 9, line 13, claim 1: "an Radio Frequency" to read as --a Radio Frequency--

Column 9, line 46, claim 4: "an Radio Frequency" to read as --a Radio Frequency--

Column 10, line 10, claim 6: "consecutive burst" to read as --consecutive bursts--

Signed and Sealed this
Fourteenth Day of June, 2011

David J. Kappos
*Director of the United States Patent and Trademark Office*